(12) United States Patent
Ueda et al.

(10) Patent No.: US 8,619,661 B2
(45) Date of Patent: Dec. 31, 2013

(54) MOBILE COMMUNICATION SYSTEM, RADIO CONTROL DEVICE, MOBILE TERMINAL, AND MESSAGE TRANSMISSION METHOD

(75) Inventors: Yoshio Ueda, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 757 days.

(21) Appl. No.: 12/739,853

(22) PCT Filed: Sep. 1, 2008

(86) PCT No.: PCT/JP2008/065659
§ 371 (c)(1),
(2), (4) Date: Apr. 26, 2010

(87) PCT Pub. No.: WO2009/054186
PCT Pub. Date: Apr. 30, 2009

(65) Prior Publication Data
US 2010/0254360 A1   Oct. 7, 2010

(30) Foreign Application Priority Data
Oct. 25, 2007   (JP) ................................ 2007-277481

(51) Int. Cl.
*H04H 20/71* (2008.01)
(52) U.S. Cl.
USPC ............ 370/312; 370/331; 370/474; 455/436
(58) Field of Classification Search
None
See application file for complete search history.

(56) References Cited

U.S. PATENT DOCUMENTS

| | | | | |
|---|---|---|---|---|
| 8,504,011 | B2* | 8/2013 | Gao et al. | 370/331 |
| 2006/0058047 | A1* | 3/2006 | Jeong et al. | 455/436 |
| 2006/0245386 | A1* | 11/2006 | Hu | 370/312 |
| 2009/0052364 | A1* | 2/2009 | Gonsa et al. | 370/312 |
| 2013/0155959 | A1* | 6/2013 | Ikeda et al. | 370/328 |

FOREIGN PATENT DOCUMENTS

| | | |
|---|---|---|
| EP | 1 675 425 A2 | 6/2006 |
| EP | 1 715 699 A1 | 10/2006 |
| JP | 2004-222080 A | 8/2004 |
| JP | 2004-312750 A | 11/2004 |
| JP | 2005-323378 A | 11/2005 |
| JP | 2007-500469 A | 1/2007 |
| JP | 2007-502573 A | 2/2007 |
| WO | 2006/068451 A | 6/2006 |

OTHER PUBLICATIONS

International Search Report for PCT/JP2008/065659, mailed Dec. 2, 2008.
3GPP TS25. 331 V7.6.0, 2007.09, chapters 8.7.3, 8.7.6, 10.2.16i, 10.2.16j.

(Continued)

*Primary Examiner* — Jeffrey M Rutkowski

(57) ABSTRACT

A mobile communication system according to the present invention comprises a mobile terminal (60) and a radio control apparatus (20) for sending an MBMS MODIFIED SERVICES INFORMATION message to the mobile terminal (60) on a DCCH. The radio control apparatus (20) comprises a controller (21) for including cell identification information in the MBMS MODIFIED SERVICES INFORMATION message, and a transmitter (22) for sending the MBMS MODIFIED SERVICES INFORMATION message with the cell identification information included therein to the mobile terminal (60) on the DCCH.

18 Claims, 10 Drawing Sheets

(56) References Cited

OTHER PUBLICATIONS

3GPP TSG-RAN WG2 Meeting #59, Tdoc R2-073434, 2007.08.20, pp. 1-11.

Lucent Technologies et al., "Updates of MBMS scenarios", 3GPP TSG-RAN3 Meeting #47, R3-050713, Athens, Greece, 25.931 CR31, rev.1, ver. 6.1.0, May 2005. Cited in EP Search Report.
The extended European Search Report for EP Application No. 08840795.2 dated on Sep. 3, 2013.

* cited by examiner

SOLID LINE: RADIO LINK IN COMMUNICATION
BROKEN LINE: UE READS MBMS CONTROL
INFORMATION ON
S-CCPCH (MCCH)

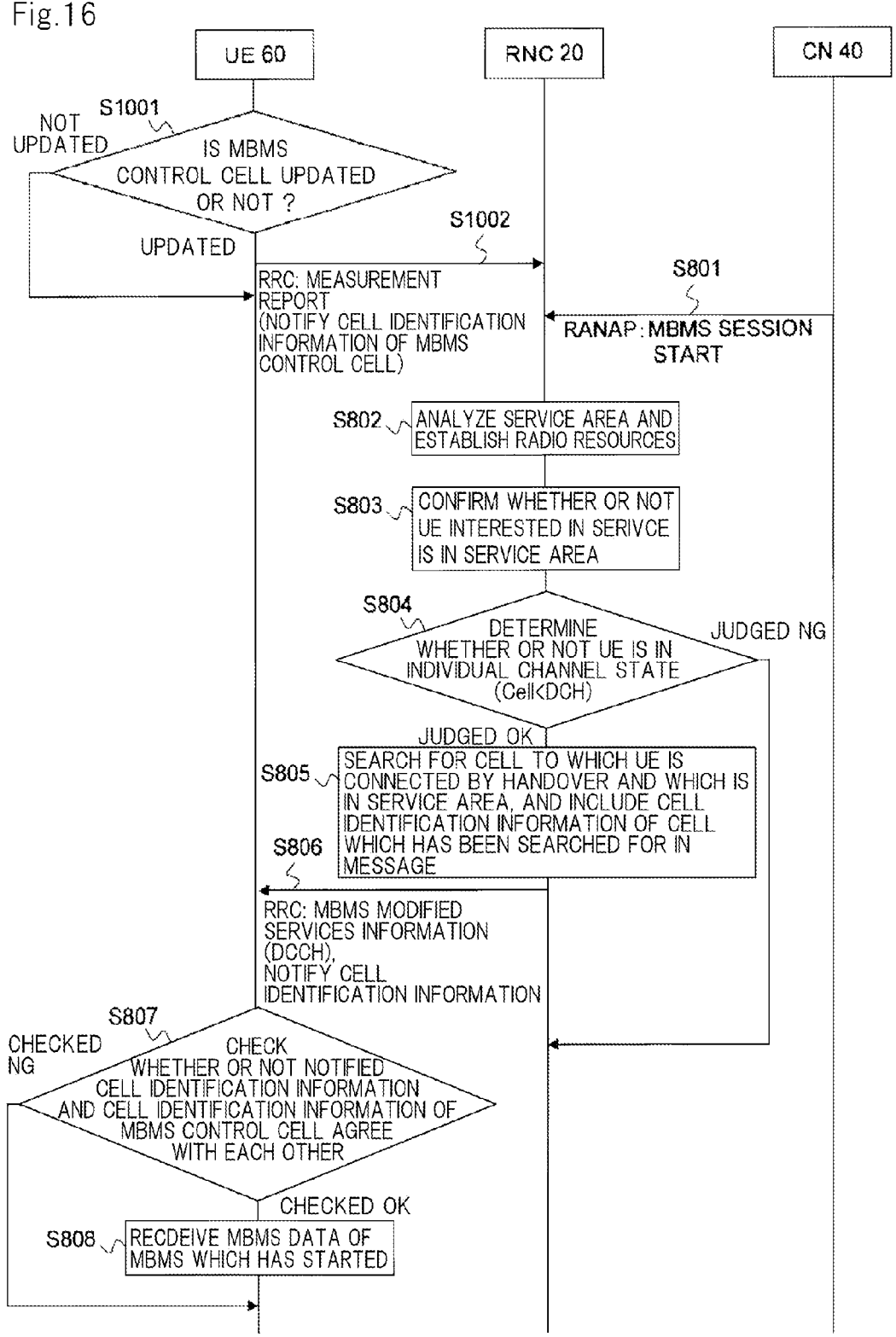

MOBILE COMMUNICATION SYSTEM, RADIO CONTROL DEVICE, MOBILE TERMINAL, AND MESSAGE TRANSMISSION METHOD

The present application is the National Phase of PCT/JP2008/065659, filed on Sep. 1, 2008, which claims priority based on Japanese patent application No. 2007-277481 filed on Oct. 25, 2007, and incorporates herein the entire disclosure thereof by reference.

TECHNICAL FIELD

The present invention relates to a mobile communication system, a radio control apparatus, a mobile terminal, and a message transmitting method for providing MBMSs (Multimedia Broadcast Multicast Services).

BACKGROUND ART

In recent years, there have been put to practical use services called MBMS for simultaneously distributing multimedia data (hereinafter referred to as MBMS data) such as movie and music data to a plurality of mobile terminals by way of broadcast or multicast transmission.

FIG. 1 shows the configuration of a mobile communication system which is capable of providing MBMSs. The configuration shown in FIG. 1 is stipulated by 3GPP (3rd Generation Partnership Projects).

As shown in FIG. 1, the mobile communication system includes UTRAN (Universal Terrestrial Radio Access Network) 10 connected to CN (Core Network) 40. CN 40 has SGSN (Serving GPRS Support Node) 50 at its junction with UTRAN 10.

UTRAN 10 comprises RNCs (Radio Network Controllers) 20 and nodes B (base station apparatus) 30. Each node B 30 serves to cover a cell or a plurality of cells, and is connected to UE (User Equipment) 60 by a radio interface.

When the mobile communication system constructed as described above starts to provide an MBMS, RNC 20 sends an MBMS MODIFIED SERVICES INFORMATION message to UE 60 that is interested in the MBMS in order to notify that the MBMS will be started, and thereafter starts distributing MBMS data. When other changes are to be made to the MBMS, e.g., when the MBMS is to be ended, RNC 20 also sends an MBMS MODIFIED SERVICES INFORMATION message to UE 60.

According to one method of sending an MBMS MODIFIED SERVICES INFORMATION message, an MCCH (MBMS point-to-multipoint Control Channel) is used as disclosed in Patent document 1, for example. Generally, while UE 60 is establishing an individual channel (Cell_DCH), UE 60 is able to receive an individual channel DPDCH, but unable to receive a common channel S-CCPCH. The MCCH is mapped onto the S-CCPCH. Therefore, while UE 60 is establishing an individual channel, it cannot receive the MCCH.

According to another method of sending an MBMS MODIFIED SERVICES INFORMATION message, an MICH (MBMS notification Indicator Channel) is used if UE 60 supports the MICH. However, UE 60 does not notify RNC 20 of whether or not it supports the MICH.

Therefore, RNC 20 needs to send an MBMS MODIFIED SERVICES INFORMATION message to UE 60 while it is establishing an individual channel, on a DCCH (Dedicated Control Channel).

In advance, UE 60 sets an MBMS selected from the MBMSs provided by network operators in an MBMS MODIFICATION REQUEST message, and sends the MBMS MODIFICATION REQUEST message to RNC 20. Based on the MBMS MODIFICATION REQUEST message from UE 60, RNC 20 determines the MBMS in which UE 60 is interested in.

Related methods of sending an MBMS MODIFIED SERVICES INFORMATION message and an MBMS MODIFICATION REQUEST message will be described below.

(1) Method of Sending an MBMS MODIFIED SERVICES INFORMATION Message:

It is assumed that RNC 20 is triggered by the reception of notification of the start of the MBMS from CN 40 to send an MBMS MODIFIED SERVICES INFORMATION message representing the start of an MBMS to UE 60.

RNC 20 also sends an MBMS MODIFIED SERVICES INFORMATION message when it receives notification of any of other changes made to the MBMS from CN 40.

As shown in FIG. 2, when RNC 20 receives an MBMS SESSION START message representative of the start of the MBMS from CN 40 in step 1201, RNC 20 analyzes a cell serving as a service area of the MBMS and establishes radio resources in step 1202.

Then, in step 1203, RNC 20 searches a memory thereof for UE 60 which is interested in the MBMS.

In step 1204, RNC 20 determines whether or not UE 60 searched for in step 1203 has been establishing an individual channel.

If UE 60 that was discovered in step 1203 is establishing an individual channel, then RNC 20 sends an MBMS MODIFIED SERVICES INFORMATION message to UE 60 on a DCCH in step 1205.

If UE 60 that was searched for in step 1203 has not been establishing an individual channel, then RNC 20 sends an MBMS MODIFIED SERVICES INFORMATION message to UE 60 on an MCCH or an MICH.

(2) Method of Sending an MBMS MODIFICATION REQUEST Message:

According to the 3GPP, RNCs 20, nodes B 30, the cells, and the frequency bands can be shared by a plurality of network operators in a network configuration such as an MOCN (Multi-Operator Core Network), a GWCN (Gateway Core Network), etc. Such an environment is called a network sharing environment.

In the network sharing environment, RNC 20 sets a list of network operators (Multiple PLMN List) in an MIB (Master Information Block) of announcement information as system information, and sends the announcement information to UE 60.

In the network sharing environment, UE 60 can set an MBMS selected from the MBMSs provided by the network operators in an MBMS MODIFICATION REQUEST message according to an MBMS Selected Service Info parameter, and can send the MBMS MODIFICATION REQUEST message to RNC 20. For example, an MBMS selected by UE 60 based on the selection of a channel on Mobile-TV is notified to UTRAN 10. Service ID (identification information) is defined for each of the MBMS provided by the network operators.

UE 60 sets the selected MBMS in the MBMS MODIFICATION REQUEST message by notifying the network operator which provides the MBMS according to any one of processes (A) through (C) shown below.

(A) Notifying the same network operator ID as a network operator ID (identification information) in the Multiple PLMN List in the MIB.

(B) Notifying a network operator ID in the Multiple PLMN List in the MIB.

(C) Sending a network operator ID itself independently of the MIB.

Since no standards clearly show which of the processes (A) through (C) should be used by UE 60, the process to be used depends on how UE 60 is implemented.

However, the above methods of sending an MBMS MODIFIED SERVICES INFORMATION message and an MBMS MODIFICATION REQUEST message suffer the following problems:

(1) The Problems of the Method of Sending an MBMS MODIFIED SERVICES INFORMATION Message:

As shown in FIG. 3, while UE 60 is establishing an individual channel, UE 60 can be in a handover state having a radio link to a plurality of cells (in a state of soft handover to a plurality of cells).

For receiving MBMS data of an MBMS, UE 60 reads MBMS control information about the MBMS (e.g., information as to which cell's MBMS data are to be received and combined) on an MCCH, and thereafter receives the MBMS data based on the MBMS control information read on the MCCH. The cell from which the MBMS control information is read on the MCCH is referred to as an MBMS control cell. If UE 60 is in a handover state, then any one of a plurality of cells to which a radio link has been established by the handover is a candidate for an MBMS control cell. The cell selected by UE 60 as an MBMS control cell is not notified to RNC 20.

For example, it is assumed that, as shown in FIG. 3, UE 60 is simultaneously connected to cell 1, cell 2, and cell 3 by handover, selects cells 2 as an MBMS control cell, and receives the MBMS control information from the MBMS control cell on the MCCH. It is also assumed that cell 2 has already started service 2 of the MBMS and cell 3 has also already started service 3 of the MBMS, and that service 1 of the MBMS is started by an MBMS SESSION START message from CN 40, and the service area of service 1 covers cell 1, cell 4, cell 5, and cell 6, i.e., service 1 is started by cell 1, but not by cell 2 and cell 3.

RNC 20 sends an MBMS MODIFIED SERVICES INFORMATION message about service 1 to UE 60. However, since the MBMS MODIFIED SERVICES INFORMATION message is unable to send information about cells, UE 60 may malfunction.

This problem will be described in detail below.

UE 60 has selected cell 2 as an MBMS control cell, and can read only MBMS control information about cell 2 on the MCCH. Stated otherwise, UE 60 is unable to read MBMS control information about cell 1 on the MCCH, and, as a result, is unable to receive MBMS data according to service 1.

Since UE 60 is simultaneously connected to cell 1, cell 2, and cell 3 by handover, RNC 20 sends an MBMS MODIFIED SERVICES INFORMATION message about service 1 to UE 60 on the DCCH through cell 1, cell 2, and cell 3. At this time, as described above, the MBMS MODIFIED SERVICES INFORMATION message sent from RNC 20 to UE 60 is unable to send information about cells.

Therefore, UE 60 cannot recognize which cell the MBMS MODIFIED SERVICES INFORMATION message about service 1 has been sent to, and hence cannot determine which cell has started service 1.

As a consequence, a problem arises in that UE 60 processes the MBMS MODIFIED SERVICES INFORMATION message about service 1 and attempts to receive MBMS data according to service 1 though it is unable to receive MBMS data according to service 1.

Depending on its ability, UE 60 may not simultaneously receive MBMS data according to a plurality of MBMS and may not simultaneously receive MBMS data according to MBMS and services other than MBMS (ordinary packet services). When such UE 60 receives the MBMS MODIFIED SERVICES INFORMATION message about service 1 on the DCCH, it prioritizes service 1 and MBMS and services other than MBMS which have currently been received.

If the priority of service 1 is high, then a problem also arises in that UE 60 finishes the MBMS and services other than MBMS which have currently been received that have lower priorities, thus performing a bearer releasing process, according to a Deactivate PDP context request process in order to receive MBMS data according to service 1.

(2) The Problems of the Method of Sending an MBMS MODIFICATION REQUEST Message:

As described above, the processes (A) through (C) are available for UE 60 to notify the network operator which provides selected the MBMS in the MBMS MODIFICATION REQUEST message.

The processes (A), (B) are processes for simplifying and notifying a network operation ID depending on the announcement information. However, since the MBMS MODIFICATION REQUEST message sent from UE 60 to RNC 20 is unable to send information about cells, RNC 20 may malfunction in the network sharing environment according to the processes (A), (B).

This problem will be described in detail below.

FIG. 4 shows a network sharing configuration wherein SGSNs 50 of three network operators are connected to single RNC 20. FIG. 4 shows the relationship between SGSNs 50 and RNC 20, and FIG. 5 shows which network operator controls each cell.

As shown in FIG. 5, a case will be analyzed in which RNC 20 as a higher-level apparatus is controlled by cell 1 of network operator 1, cell 2 of network operator 2, and cell 3 of network operator 3, i.e., RNC 20 is shared by a plurality of network operators. In this case, it is assumed that a service having service ID=1 of network operator 1 is being carried out by cell 1, a service having service ID=1 of network operator 2 is being carried out by cell 2, and a service having service ID=1 of network operator 3 is being carried out by cell 3. However, inasmuch as MBMS services have service IDs defined for respective network operators, services having one service ID may not be necessarily the same as each other provided that their network operators IDs are different from each other. It is also assumed that UE 60 is simultaneously connected to cell 1, cell 2, and cell 3 by handover and reads announcement information from cell 2.

In the case shown in FIG. 5, it is assumed that UE 60 has sent an MBMS MODIFICATION REQUEST message to RNC 20 according to the process (A) or (B) in steps 1601, 1602 shown in FIG. 6.

However, as described above, the MBMS MODIFICATION REQUEST message is unable to send information about cells.

Therefore, RNC 20 cannot recognize from the MBMS MODIFICATION REQUEST message from which cell UE 60 is reading announcement information. Consequently, when UE 60 notifies a network operator ID according to the simplified process (A) or (B), RNC 20 may possibly mistake the network operator selected by UE 60 as the network operator of cell 1 or cell 3 rather than cell 2.

If RNC 20 mistakes the network operator selected by UE 60, then RNC 20 cannot properly notify that the MBMS has been changed to UE 60.

As described above, the MBMS MODIFIED SERVICES INFORMATION message and the MBMS MODIFICATION REQUEST message are problematic in that they are unable to send information about cells.

Patent document: JP-A No. 2004-312750

DISCLOSURE OF THE INVENTION

It is an object of the present invention to provide a mobile communication system, a radio control apparatus, a mobile terminal, and a message transmitting method which will solve the above problems.

A first mobile communication system according to the present invention comprises a mobile terminal and a radio control apparatus for sending an MBMS MODIFIED SERVICES INFORMATION message to said mobile terminal on a DCCH, said radio control apparatus comprising a controller for including cell identification information in said MBMS MODIFIED SERVICES INFORMATION message, and a transmitter for sending said MBMS MODIFIED SERVICES INFORMATION message with the cell identification information included therein to said mobile terminal on the DCCH.

A second mobile communication system according to the present invention comprises a radio control apparatus and a mobile terminal for sending an MBMS MODIFICATION REQUEST message to said radio control apparatus on a DCCH, said mobile terminal comprising a controller for including cell identification information in said MBMS MODIFICATION REQUEST message, and a transmitter for sending said MBMS MODIFICATION REQUEST message with the cell identification information included therein to said radio control apparatus on the DCCH.

A radio control apparatus according to the present invention for sending an MBMS MODIFIED SERVICES INFORMATION message to a mobile terminal on a DCCH, comprises a controller for including cell identification information in said MBMS MODIFIED SERVICES INFORMATION message, and a transmitter for sending said MBMS MODIFIED SERVICES INFORMATION message with the cell identification information included therein to said mobile terminal on the DCCH.

A first mobile terminal according to the present invention for receiving an MBMS MODIFIED SERVICES INFORMATION message from a radio control apparatus on a DCCH, comprises a receiver for receiving said MBMS MODIFIED SERVICES INFORMATION message with cell identification information included therein from said radio control apparatus.

A second mobile terminal according to the present invention for sending an MBMS MODIFICATION REQUEST message to a radio control apparatus on a DCCH, comprises a controller for including cell identification information in said MBMS MODIFICATION REQUEST message, and a transmitter for sending said MBMS MODIFICATION REQUEST message with the cell identification information included therein to said radio control apparatus on the DCCH.

According to the present invention, there is provided a first message transmitting method for sending an MBMS MODIFIED SERVICES INFORMATION message from a radio control apparatus to a mobile terminal on a DCCH, wherein said radio control apparatus includes cell identification information in said MBMS MODIFIED SERVICES INFORMATION message, and said radio control apparatus sends said MBMS MODIFIED SERVICES INFORMATION message with the cell identification information included therein to said mobile terminal on the DCCH.

According to the present invention, there is provided a second message transmitting method for sending an MBMS MODIFICATION REQUEST message from a mobile terminal to a radio control apparatus on a DCCH, wherein said mobile terminal includes cell identification information in said MBMS MODIFICATION REQUEST message, and said mobile terminal sends said MBMS MODIFICATION REQUEST message with the cell identification information included therein to said radio control apparatus on the DCCH.

With the first mobile communication system according to the present invention, the radio control apparatus includes cell identification information in the MBMS MODIFIED SERVICES INFORMATION message, and sends it to the mobile terminal on the DCCH.

Therefore, the radio control apparatus can notify information about cells to the mobile terminal using the MBMS MODIFIED SERVICES INFORMATION message.

With the second mobile communication system according to the present invention, the mobile terminal includes cell identification information in the MBMS MODIFICATION REQUEST message, and sends it to the radio control apparatus on the DCCH.

Therefore, the mobile terminal can notify information about cells to the radio control apparatus using the MBMS MODIFICATION REQUEST message.

BRIEF DESCRIPTION OF THE DRAWINGS

FIG. 16 is a sequence diagram illustrative of a method of sending an MBMS MEASUREMENET REPORT message according to the third exemplary embodiment of the present invention.

BEST MODE FOR CARRYING OUT THE INVENTION

Figure 1:
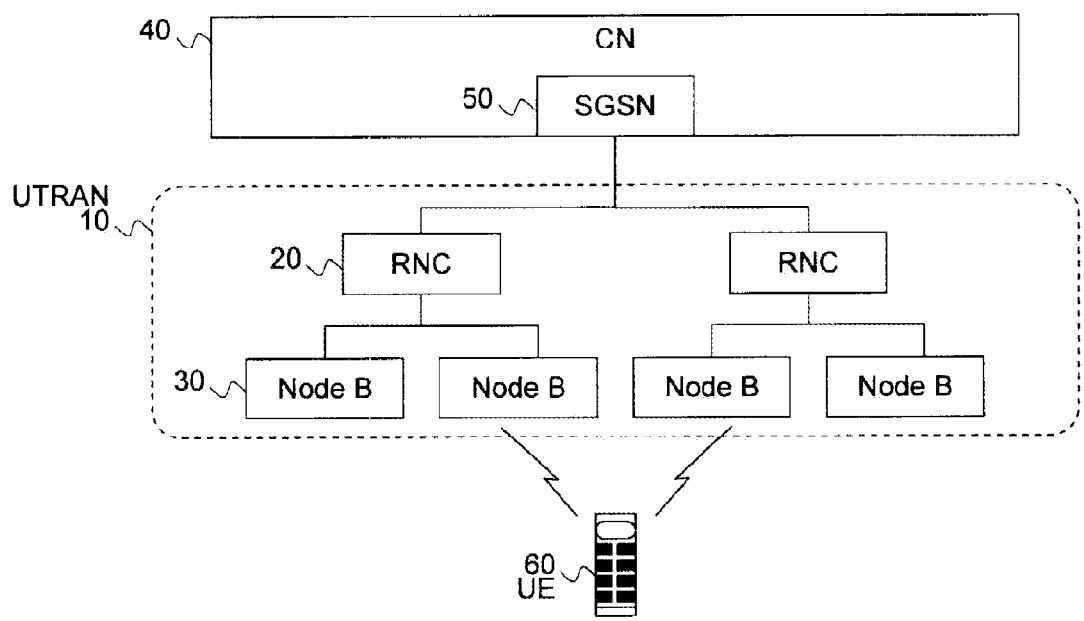
FIG. 1 is a diagram showing the configuration of a relevant mobile communication system.
Figure 2:
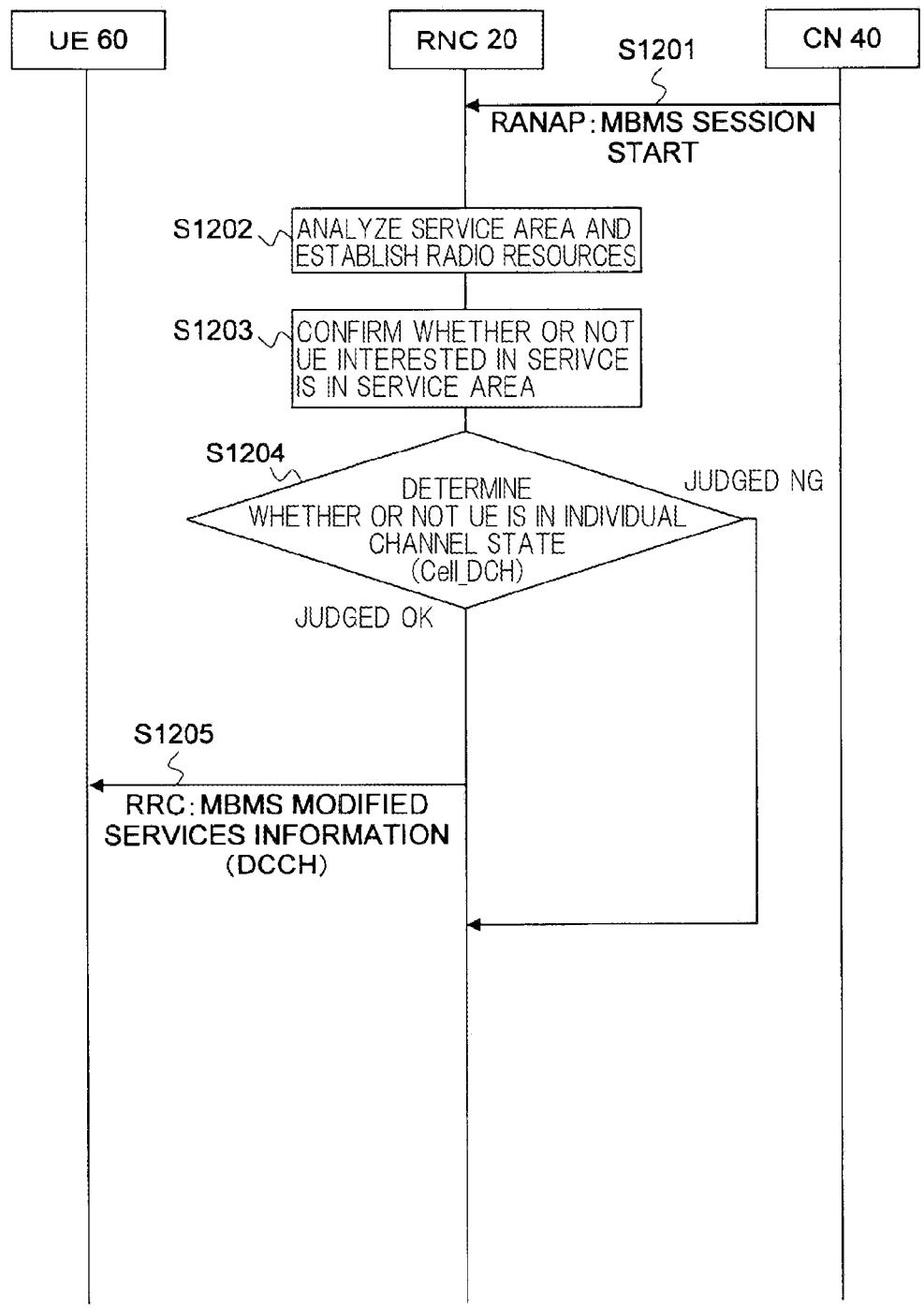
FIG. 2 is a sequence diagram illustrative of a method of sending a relevant MBMS MODIFIED SERVICES INFORMATION message.

The best mode for carrying out the invention will be described below with reference to the drawings. The overall configuration of a mobile communication system according to exemplary embodiments of the present invention is the same as the configuration shown in FIG. 1.

First Exemplary Embodiment

Figure 7:
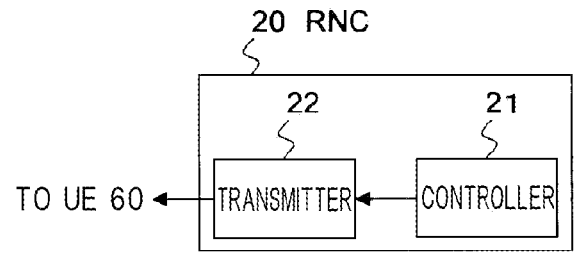
FIG. 7 is a block diagram showing the configuration of a radio control apparatus according to a first exemplary embodiment of the present invention.
Figure 8:
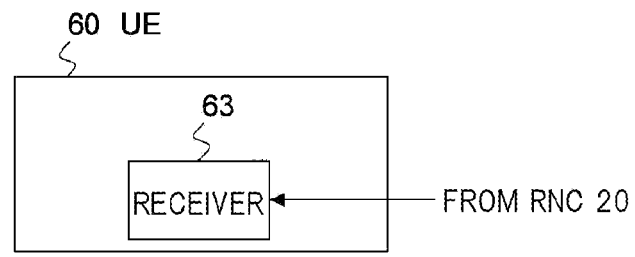
FIG. 8 is a block diagram showing the configuration of a mobile terminal according to the first exemplary embodiment of the present invention.

FIGS. 7 and 8 show the configurations of RNC 20 and UE 60, respectively, according to a first exemplary embodiment of the present invention.

As shown in FIG. 7, RNC 20 comprises controller 21 for including cell identification information in an MBMS MODIFIED SERVICES INFORMATION message and transmitter 22 for sending the MBMS MODIFIED SERVICES INFORMATION message including the cell identification information to UE 60 on a DCCH.

As shown in FIG. 8, UE 60 comprises receiver 63 for receiving the MBMS MODIFIED SERVICES INFORMATION message including the cell identification information from RNC 20 on the DCCH.

A method of sending an MBMS MODIFIED SERVICES INFORMATION message according to the present exemplary embodiment will be described below with reference to FIG. 9.

Figure 9:
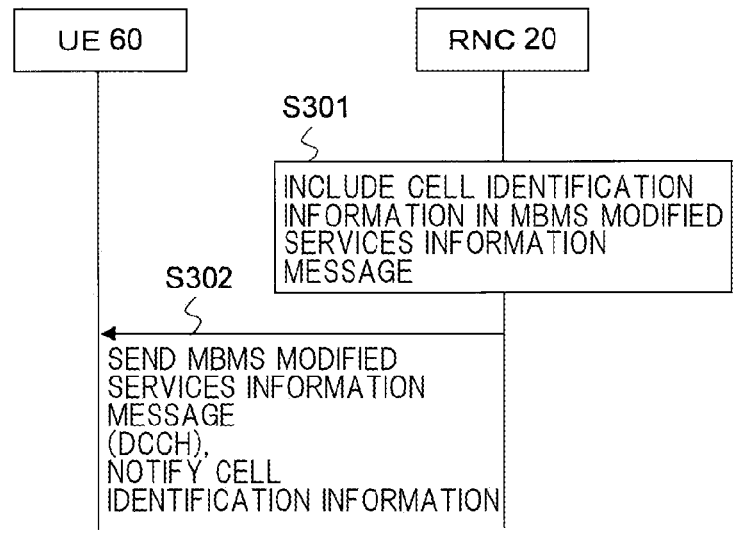
FIG. 9 is a sequence diagram illustrative of a method of sending an MBMS MODIFICATION REQUEST message according to the first exemplary embodiment of the present invention.

As shown in FIG. 9, controller 21 of RNC 20 includes cell identification information in an MBMS MODIFIED SERVICES INFORMATION message in step 301.

Then, transmitter 22 of RNC 20 sends the MBMS MODIFIED SERVICES INFORMATION message including the cell identification information to UE 60 on a DCCH in step 302.

Receiver 63 of UE 60 receives the MBMS MODIFIED SERVICES INFORMATION message including the cell identification information.

According to the present exemplary embodiment, therefore, RNC 20 can notify information about cells to UE 60 using the MBMS MODIFIED SERVICES INFORMATION message.

Second Exemplary Embodiment

Figure 10:
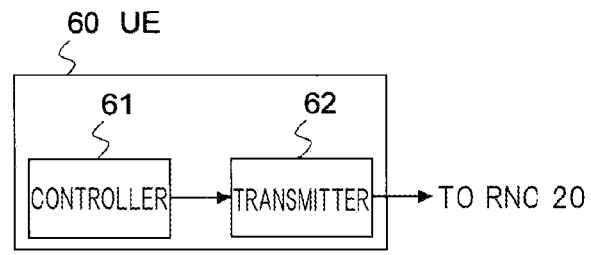
FIG. 10 is a block diagram showing the configuration of a mobile terminal according to a second exemplary embodiment of the present invention.

FIG. 10 shows the configuration of UE 60 according to a second exemplary embodiment of the present invention.

As shown in FIG. 10, UE 60 comprises controller 61 for including cell identification information in an MBMS MODIFICATION REQUEST message and transmitter 62 for sending the MBMS MODIFICATION REQUEST message including the cell identification information to RNC 20 on a DCCH.

A method of sending an MBMS MODIFICATION REQUEST message according to the present exemplary embodiment will be described below with reference to FIG. 11.

Figure 11:
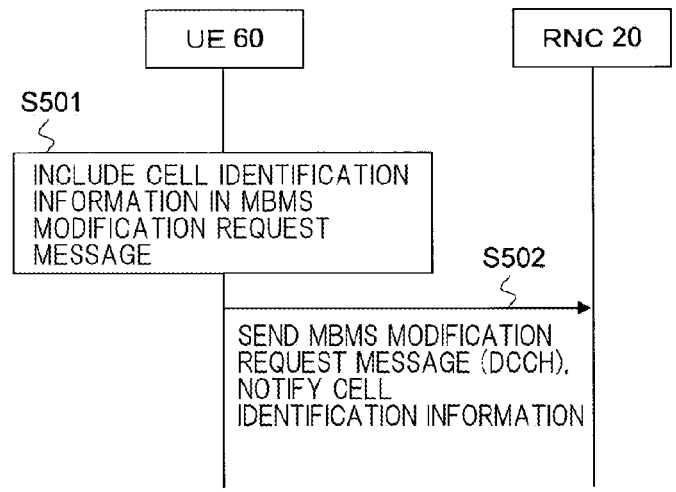
FIG. 11 is a sequence diagram illustrative of a method of sending an MBMS MEASUREMENET REPORT message according to the second exemplary embodiment of the present invention.

As shown in FIG. 11, controller 61 of UE 60 includes cell identification information in an MBMS MODIFICATION REQUEST message in step 501.

Then, transmitter 62 of UE 60 sends the MBMS MODIFICATION REQUEST message including the cell identification information to RNC 20 in a DCCH in step 502.

According to the present exemplary embodiment, therefore, UE 60 can notify information about cells to RNC 20 using the MBMS MODIFICATION REQUEST message.

Third Exemplary Embodiment

Figure 12:
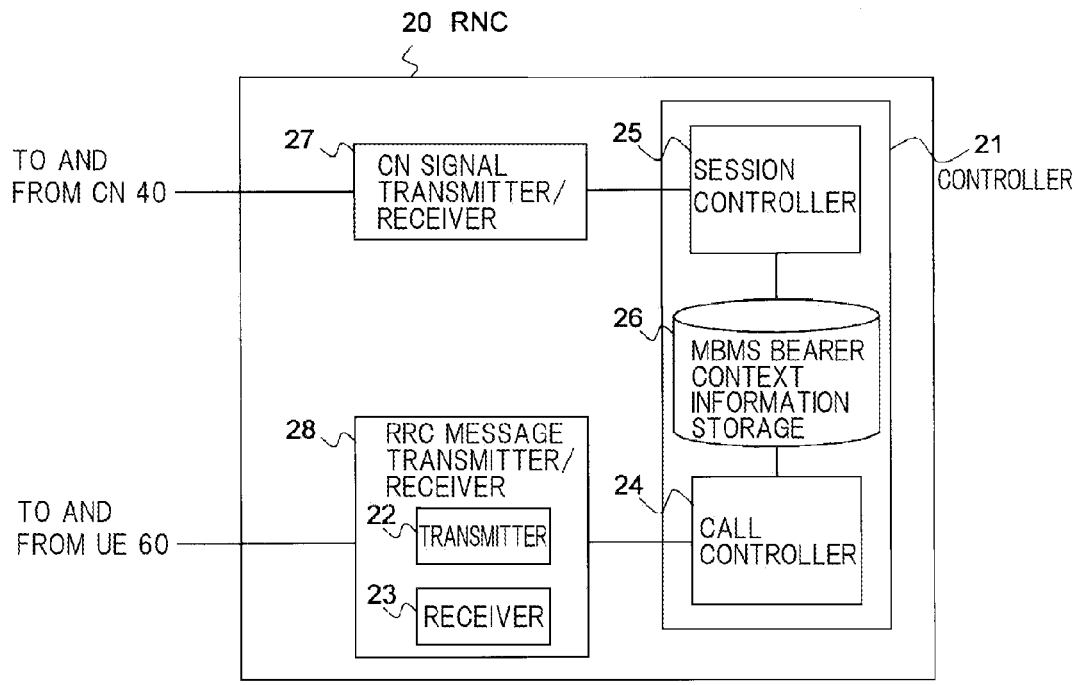
FIG. 12 is a block diagram showing the configuration of a radio control apparatus according to a third exemplary embodiment of the present invention.
Figure 13:
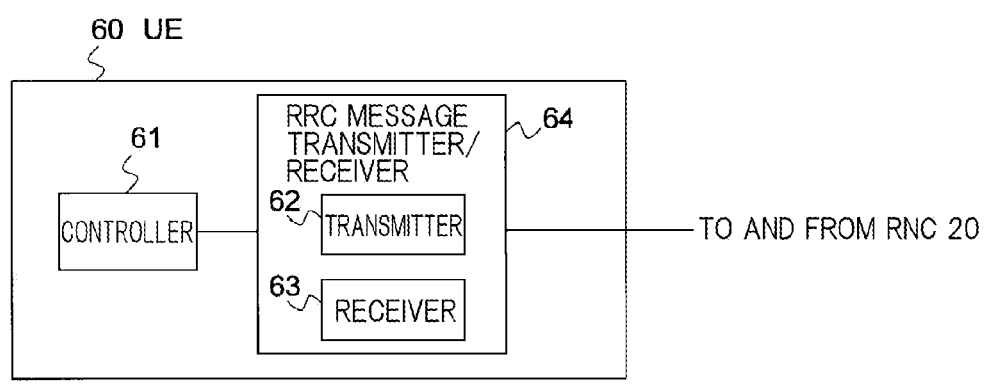
FIG. 13 is a block diagram showing the configuration of a mobile terminal according to the third exemplary embodiment of the present invention.

FIGS. 12 and 13 show the configurations of RNC 20 and UE 60, respectively, according to a third exemplary embodiment of the present invention. The present exemplary embodiment represents a more specific version of the configuration of RNC 20 shown in FIG. 7 and the configurations of UEs 60 shown in FIGS. 8 and 10.

As shown in FIG. 12, RNC 20 comprises call controller 24 for controlling UE 60 to send an outgoing call, receive an incoming call, and register its position for each call, session controller 25 for controlling each session to start and stop a service session with SGSN 50, MBMS bearer context information storage 26 for storing information about an MBMS bearer (TMGI (Temporary Mobile Group Identity) and information of UE 60 which is joined for service reception), CN signal transmitter/receiver 27 for sending and receiving a RANAP (Radio Access Network Application Part) message to and from SGSN 50, and RRC message transmitter/receiver 28 for sending and receiving an RRC message to and from UE 60.

In FIG. 12, session controller 25, MBMS bearer context information storage 26, call controller 24, and CN signal transmitter/receiver 27 make up controller 21 shown in FIG. 7. RRC message transmitter/receiver 28 has transmitter 22 shown in FIG. 7 and also has receiver 23.

When session controller 25 receives an MBMS SESSION START message as a RANAP message for the first time from CN 40 through SGSN 50, session controller 25 stores bearer information (TMGI, MBMS Session ID, MBMS Session Repetition Number, MBMS service area information, MBMS bearer service type, etc.) with respect to the MBMS into MBMS bearer context information storage 26.

Session controller 25 reads station data based on the MBMS service area information requested from CN 40, and determines a candidate for a cell with which an MBMS is to be established.

If the MBMS bearer service type is either a multicast transmission or a broadcast transmission to which a counting procedure is applied, then session controller 25 selects a bearer type (either a PTM (Point-to-Multi) bearer or a PTP (Point-to-Point) bearer) and establishes a session in response to a request from CN 40 to establish a session.

If the MBMS bearer service type is a broadcast transmission to which a counting procedure is not applied, then session controller 25 establishes a PTM bearer in response to a request from CN 40 to establish a session.

The process of selecting a bearer type (a PTM bearer or a PTP bearer) and the establishment of a PTM bearer will not be described in detail below as they have no direct bearing on the present invention.

For establishing a PTM bearer, session controller 25 controls the corresponding cell to carry out a procedure for establishing a common channel (S-CCPCH (Common Control Physical Channel)). Session controller 25 notifies the start of a service and the establishment of a PTM bearer to UE 60 on the MICH or MCCH. At the same time, session controller 25 searches for UE 60 which is interested in the MBMS based on the bearer information stored in MBMS bearer context information storage 26, and determines whether or not UE 60 that has been searched for is in a state (Cell<DCH) of establishing an individual channel. If corresponding UE 60 is found, then session controller 25 includes cell identification information of a cell to which corresponding UE 60 is connected by the handover and which is included in the service area of the MBMS to be started, in an MBMS MODIFIED SERVICES INFORMATION message. Call controller 24 instructs RRC message transmitter/receiver 28 to send the MBMS MODIFIED SERVICES INFORMATION message on the DCCH.

For establishing a PTT bearer, session controller 25 also searches for UE 60 which is interested in the MBMS based on the bearer information stored in MBMS bearer context information storage 26, and determines whether or not UE 60 that has been searched for is in a state (Cell<DCH) of establishing an individual channel. If corresponding UE 60 is found, then call controller 24 instructs RRC message transmitter/receiver 28 to send the MBMS MODIFIED SERVICES INFORMATION message on the DCCH.

Transmitter 22 of RRC message transmitter/receiver 25 sends the MBMS MODIFIED SERVICES INFORMATION message to UE 60 on the DCCH.

When receiver 23 of RRC message transmitter/receiver 25 receives an MBMS MODIFICATION REQUEST message including cell identification information from UE 60, receiver 23 transfers the MBMS MODIFICATION REQUEST message to call controller 24.

Based on the cell identification information included in the MBMS MODIFICATION REQUEST message transferred from receiver 23, call controller 24 analyzes the service ID and the network operator ID, and updates the bearer information stored in MBMS bearer context information storage 26.

As shown in FIG. 13, UE 60 comprises controller 61 similar to the one shown in FIG. 10 and RRC message transmitter/receiver 64 for sending and receiving an RRC message to and from RNC 20.

In FIG. 13, RRC message transmitter/receiver 64 has transmitter 62 shown in FIG. 10 and receiver 63 shown in FIG. 8.

Controller 61 includes the cell identification information of a cell which is receiving announcement information as system information in an MBMS MODIFICATION REQUEST message, and instructs RRC message transmitter/receiver 64 to send the MBMS MODIFICATION REQUEST message on the DCCH.

Transmitter 62 of RRC message transmitter/receiver 64 sends the MBMS MODIFICATION REQUEST message to RNC 20 on the DCCH.

When receiver 63 of RRC message transmitter/receiver 64 receives an MBMS MODIFIED SERVICES INFORMATION message including cell identification information from RNC 20, receiver 62 sends the MBMS MODIFIED SERVICES INFORMATION message to controller 61.

Controller 61 determines whether or not the cell identification information included in the MBMS MODIFIED SERVICES INFORMATION message is in agreement with the cell identification information of an MBMS control cell which is being selected by UE 60. If they agree with each other, then controller 61 handles (processes) the MBMS MODIFIED SERVICES INFORMATION message. In other words, controller 61 processes other information than the cell identification information which is included in the MBMS MODIFIED SERVICES INFORMATION message. For example, controller 61 processes action information (MBMS Required UE action) which represents information of an action that UE 60 is required to perform, included in the MBMS MODIFIED SERVICES INFORMATION message. If the action information is set in an acquire PTM (Point-to-Multipoint) radio bearer (RB), then controller 61 acquires information about the PTM radio bearer. If the action information is set in a request PTP (Point-to-Point) radio bearer (RB), then controller 61 starts a service request procedure for receiving an MBMS. If the action information is set in a release PTM (Point-to-Multipoint) radio bearer (RB), then controller 61 stops receiving an MBMS.

If the cell identification information included in the MBMS MODIFIED SERVICES INFORMATION message transferred from receiver 63 does not agree with the cell identification information of an MBMS control cell which is being selected by UE 60, then controller 61 discards the MBMS MODIFIED SERVICES INFORMATION message.

Methods of sending an MBMS MODIFIED SERVICES INFORMATION message and an MBMS MODIFICATION REQUEST message according to the present exemplary embodiment will be described below.

(1) Method of Sending an MBMS MODIFIED SERVICES INFORMATION Message:

It is assumed that RNC 20 is triggered by the reception of notification of the start of service 1 of the MBMS from CN 40 to send an MBMS MODIFIED SERVICES INFORMATION message representing the start of service 1 to UE 60. RNC 20 also sends an MBMS MODIFIED SERVICES INFORMATION message when it receives a notification of any other changes to the MBMS from CN 40.

Figure 3:
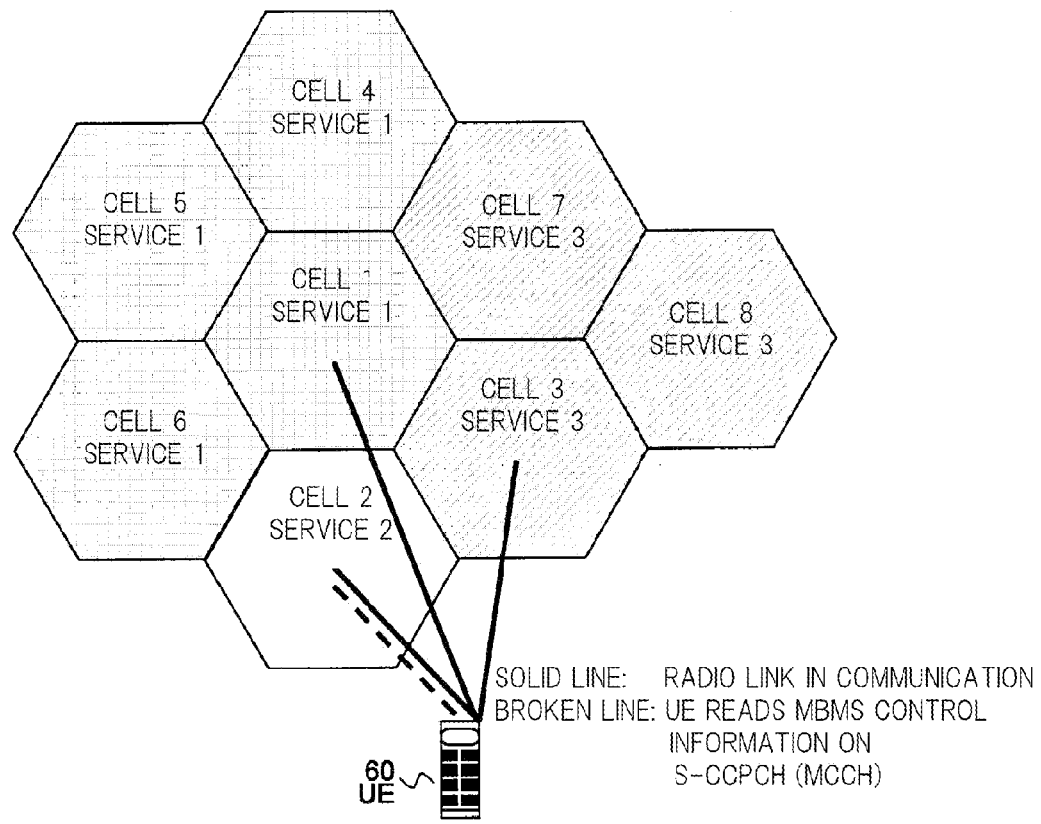
FIG. 3 is a diagram illustrative of an UE during handover in a cell configuration wherein an RNC is controlled by one network operator.

It is assumed that, as shown in FIG. 3, UE 60 is simultaneously connected to cell 1, cell 2, and cell 3 by handover, selects cells 2 as an MBMS control cell, and receives the MBMS control information from the MBMS control cell on the MCCH. It is also assumed that cell 2 has already started service 2 of the MBMS and cell 3 has also already started service 3 of the MBMS.

Figure 14:
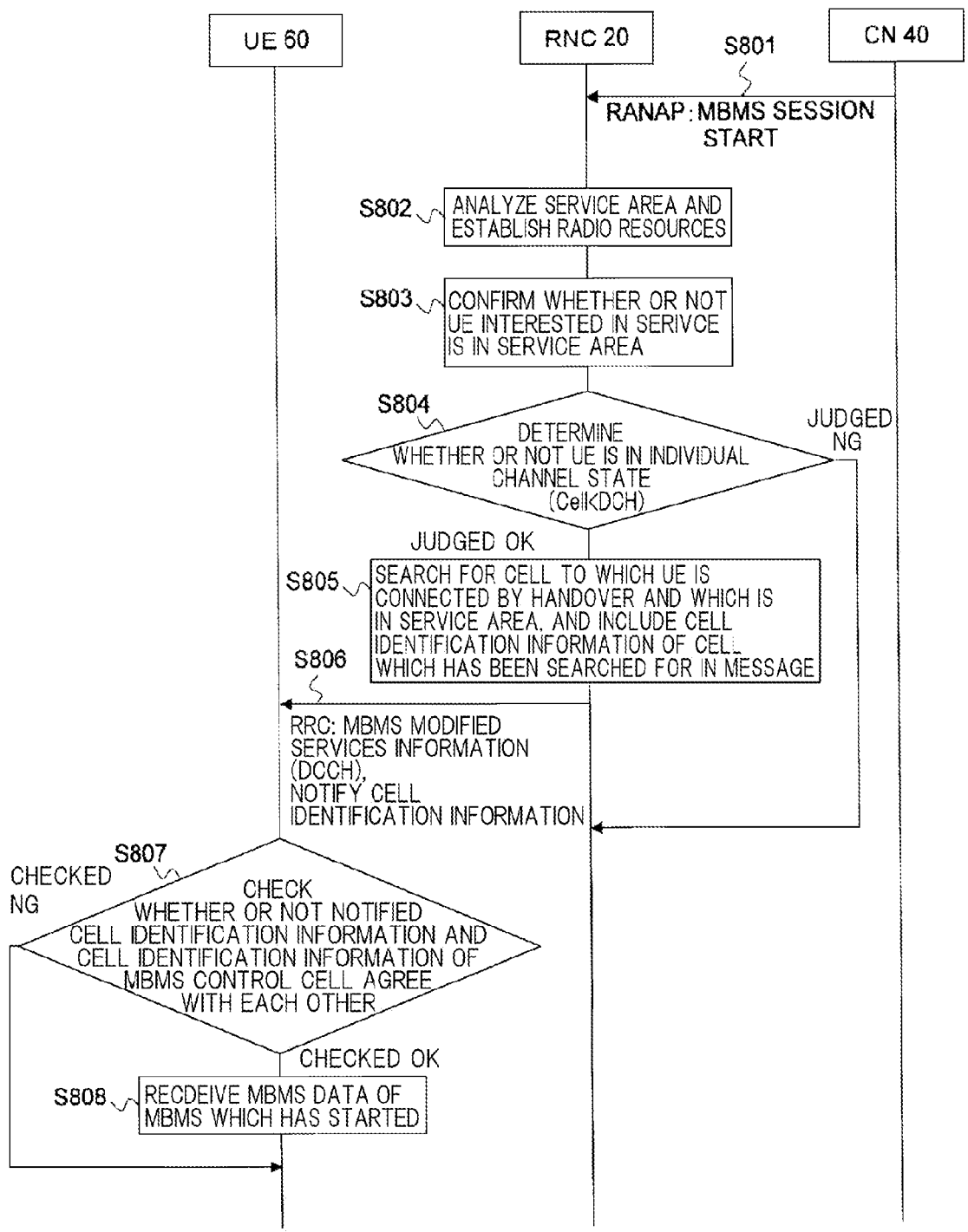
FIG. 14 is a sequence diagram illustrative of a method of sending an MBMS MODIFIED SERVICES INFORMATION message according to the third exemplary embodiment of the present invention.

As shown in FIG. 14, when RNC 20 receives an MBMS SESSION START message representative of the start of service 1 of the MBMS from CN 40 in step 801, RNC 20 analyzes a cell serving as a service area of the MBMS and establishes radio resources in step 802. It is assumed that the service area of service 1 covers cell 1, cell 4, cell 5, and cell 6.

Then, RNC 20 searches for UE 60 that is interested in service 1 and that is present in the service area of service 1 in step 803, and then determines whether or not UE 60 that has been searched for in step 803 is in a state of establishing an individual channel in step 804. In other words, RNC 20 searches for a cell which satisfies the conditions that it is "a cell included in the service area of service 1" and it is "a cell to which UE 60 in a state of establishing an individual channel is connected by the handover". It is assumed that cell 1 having cell ID=1 satisfies those conditions.

In step 805, RNC 20 includes a primary scrambling code of a primary CPICH (Primary common pilot channel) as cell identification information for UE 60 to identify cell 1, in an MBMS MODIFIED SERVICES INFORMATION message.

In step 806, RNC 20 sends the MBMS MODIFIED SERVICES INFORMATION message including the primary scrambling code as cell identification information to UE 60 on the DCCH.

If UE 60 that has been searched for in step 803 is not in a state of establishing an individual channel, then RNC 20 sends the MBMS MODIFIED SERVICES INFORMATION message on the MCCH or the MICH.

In step 807, UE 60 determines whether or not the primary scrambling code included as the cell identification information in the MBMS MODIFIED SERVICES INFORMATION message and the primary scrambling code of an MBMS control cell which is being selected by UE 60 are in agreement with each other.

If they agree with each other in step 807, then UE 60 processes the MBMS MODIFIED SERVICES INFORMATION message thereby starting to receive the MBMS data of service 1 on an MTCH (MBMS point-to-multipoint Traffic Channel) in step 808.

If they do not agree with each other in step 807, then UE 60 discards the MBMS MODIFIED SERVICES INFORMATION message. In this example, since the MBMS control cell of UE 60 is cell 2 which is not in agreement with cell 1, UE 60 discards the MBMS MODIFIED SERVICES INFORMATION message.

According to the present exemplary embodiment, as described above, RNC 20 includes the cell identification information in the MBMS MODIFIED SERVICES INFORMATION message, and sends the MBMS MODIFIED SERVICES INFORMATION message to UE 60 on the DCCH.

Therefore, RNC 20 can notify information about cells to UE 60 using the MBMS MODIFIED SERVICES INFORMATION message.

According to the present exemplary embodiment, UE 60 determines whether or not the cell identification information included in the MBMS MODIFIED SERVICES INFORMATION message is in agreement with the cell identification information of the MBMS control cell which is being selected by UE 60. If they agree with each other, then UE 60 processes the MBMS MODIFIED SERVICES INFORMATION message.

Consequently, since UE 60 can process only the MBMS MODIFIED SERVICES INFORMATION message about the MBMS whose MBMS data can be received by UE 60, UE 60 is prevented from suffering malfunctions while attempting to receive MBMS data which cannot be received. Furthermore, UE 60 is also prevented from suffering malfunctions such as a bearer releasing process for the MBMS and services other than MBMS which have presently been received, due to attempts to receive MBMS data which cannot be received.

According to the present exemplary embodiment, the cell identification information included in the MBMS MODIFIED SERVICES INFORMATION message comprises identification information of a cell to which UE 60 in a state of establishing an individual channel is connected by the handover and which is included in the service area of the MBMS to be changed.

Therefore, RNC 20 can notify which one of the cells, to which UE 60 in a state of establishing an individual channel is connected by the handover, is providing the MBMS to be changed, to UE 60.

According to the present exemplary embodiment, when UE 60 receives the MBMS MODIFIED SERVICES INFORMATION message, if the cell identification information included in the MBMS MODIFIED SERVICES INFORMATION message is in agreement with the cell identification information of the MBMS control cell of UE 60 or if no cell identification information is included in the MBMS MODIFIED SERVICES INFORMATION message, then UE 60 can process the MBMS MODIFIED SERVICES INFORMATION message.

Inasmuch as UE 60 is less likely to process MBMS MODIFIED SERVICES INFORMATION messages other than the MBMS MODIFIED SERVICES INFORMATION message about the MBMS whose MBMS data can be received by UE 60, it is possible to reduce malfunctions while attempting to receive MBMS data which cannot be received. Furthermore, it is also possible to reduce malfunctions such as a bearer releasing process for the MBMS and services other than MBMS which have currently been received, due to attempts to receive MBMS data which cannot be received.

Figure 4:
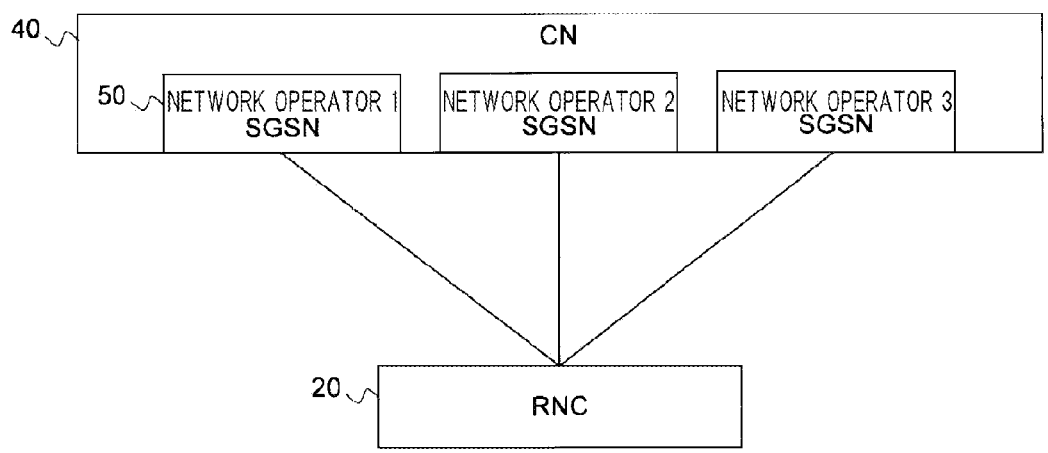
FIG. 4 is a diagram illustrative of an RNC controlled by a plurality of network operators.
Figure 5:
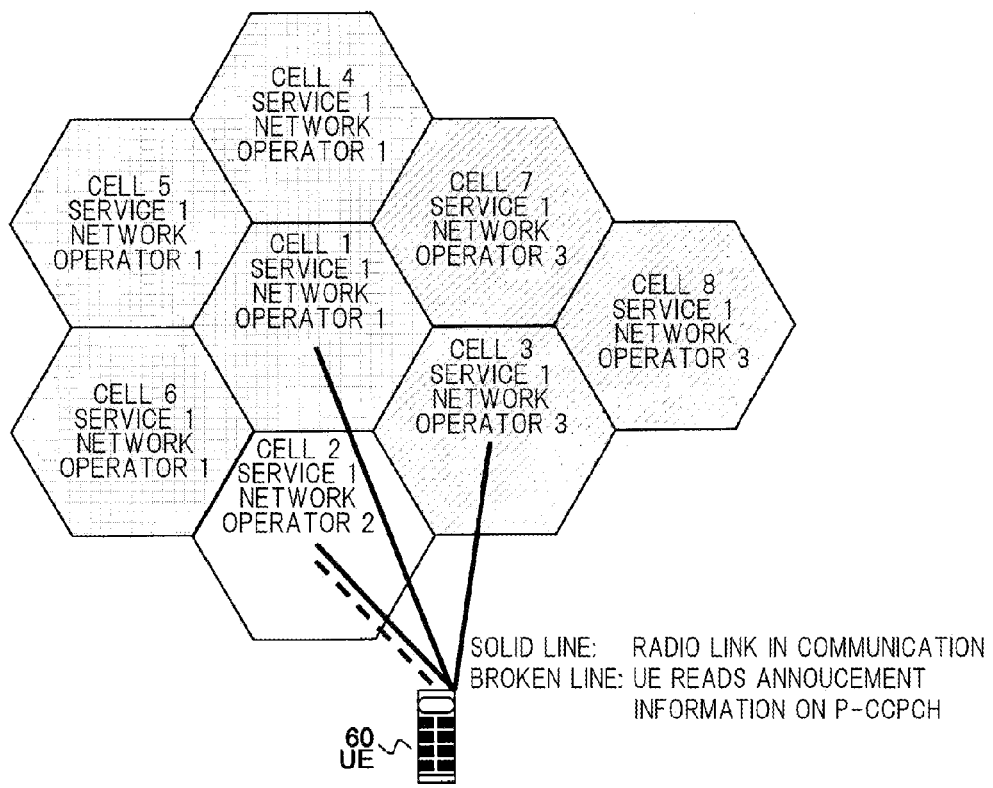
FIG. 5 is a diagram illustrative of an UE during handover in a cell configuration wherein an RNC is controlled by a plurality of network operators.
Figure 6:
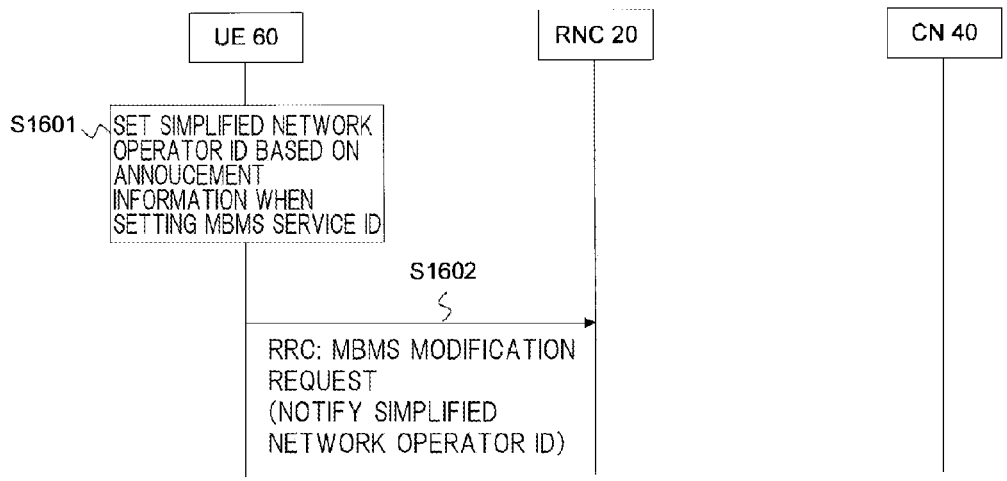
FIG. 6 is a sequence diagram illustrative of a method of sending a relevant MBMS MODIFICATION REQUEST message.

(2) Method of Sending an MBMS MODIFICATION REQUEST Message:

It is assumed that, as shown in FIG. 4, RNC 20 is shared by three network operators and, as shown in FIG. 5, UE 60 is connected to establish radio links to cell 1 of network operator 1, cell 2 of network operator 2, and cell 3 of network operator 3 by handover. It is also assumed that UE 60 has read announcement information as system information from cell 2 and that a service having service ID=1 of network operator 1 is being carried out by cell 1, a service having service ID=1 of network operator 2 is being carried out by cell 2, and a service having service ID=1 of network operator 3 is being carried out by cell 3.

Figure 15:
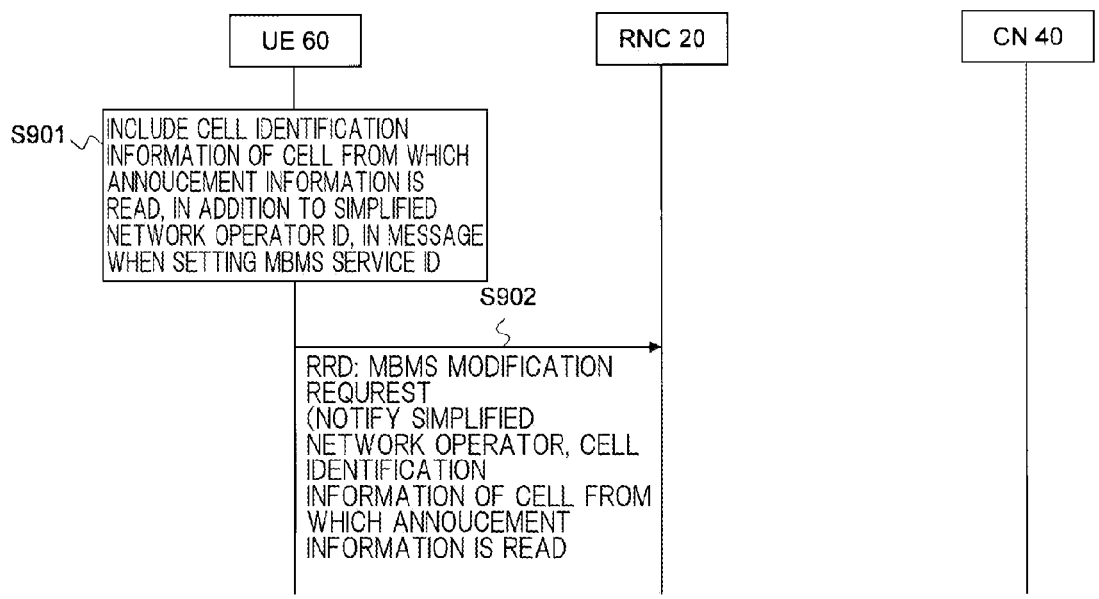
FIG. 15 is a sequence diagram illustrative of a method of sending an MBMS MODIFICATION REQUEST message according to the third exemplary embodiment of the present invention.

As shown in FIG. 15, if UE 60 notifies a network operator ID according to the simplified process (A) or (B) described in "Background art", then UE 60 includes a primary scrambling code as cell identification information about a cell from which announcement information has been read in an MBMS MODIFICATION REQUEST message in step 901 in order to notify from which cell UE 60 has read the announcement information.

Then, in step S902, UE 60 sends the MBMS MODIFICATION REQUEST message including the primary scrambling code as the cell identification information to RNC 20 on the DCCH.

According to the present exemplary embodiment, as described above, UE 60 sends the MBMS MODIFICATION REQUEST message with the cell identification information included therein to RNC 20 on the DCCH.

Therefore, UE 60 can notify information about cells to RNC 20 using the MBMS MODIFICATION REQUEST message.

According to the present exemplary embodiment, moreover, the cell identification information included in the MBMS MODIFICATION REQUEST message comprises identification information of a cell from which UE 60 has received announcement information as system information.

Consequently, UE 60 can notify to RNC 20 from which cell UE 60 has read announcement information. Since RNC 20 can thus uniquely specify the network operator ID which has been notified according to the simplified process (A) or (B), it is possible to carry out MBMSs in the network sharing environment.

According to the present exemplary embodiment, moreover, furthermore, if an MBMS control cell is updated by soft handover or hard handover, then the cell identification information of the updated MBMS control cell may be included in an RRC message (e.g., a MEASUREMENT REPORT message or an MBMS MODIFICATION REQUEST message), and sent on the DCCH. UE 60 can thus notify the updated MBMS control cell to RNC 20.

According to the present exemplary embodiment, moreover, moreover, UE 60 may include cell identification information in an MBMS MODIFICATION REQUEST message, and may set the cell identification information as the cell identification information of the MBMS control cell of UE 60. In this manner, the cell notified to RNC 20 and the MBMS control cell of UE 60 can be brought into agreement with each other.

FIG. 16 shows a case in which the cell identification information of an updated MBMS control cell is included in a MEASUREMENT REPORT message.

As shown in FIG. 16, if an MBMS control cell is updated in step 1001, then UE 60 includes a primary scrambling code as the cell identification information of the updated MBMS control cell in a MEASUREMENT REPORT message, and sends it to RNC 20. The subsequent processing sequence is the same as that shown in FIG. 14.

RNC 20 is thus capable of accurately recognizing the latest MBMS control cell selected by UE 60. Therefore, RNC 20 is prevented from sending an MBMS MODIFIED SERVICES INFORMATION message in error to UE 60 whose MBMS control cell is not present in the service area.

According to the present exemplary embodiment, UE 60 can notify a network operator ID according to the method (C) described in "Background art". In this manner, RNC 20 can be aware of a complete network operator ID and service ID, allowing MBMSs to be carried out in the network sharing environment.

In the present exemplary embodiment, the primary scrambling code is used as cell identification information. However, a cell ID may be used as cell identification information.

The present invention has been described above in reference to the exemplary embodiment. However, the present invention is not limited to the exemplary embodiment. Rather, changes that can be understood by those skilled in the art within the scope of the invention may be made to the arrangements and details of the present invention.

The invention claimed is:

1. A mobile communication system comprising a mobile terminal and a radio control apparatus for sending an MBMS MODIFIED SERVICES INFORMATION message to said mobile terminal on a DCCH, said radio control apparatus comprising:
   a controller for including cell identification information in said MBMS MODIFIED SERVICES INFORMATION message;
   a transmitter for sending said MBMS MODIFIED SERVICES INFORMATION message with the cell identification information included therein to said mobile terminal on the DCCH; and
   another controller for processing said MBMS MODIFIED SERVICES INFORMATION message if the cell identification information included in said MBMS MODIFIED SERVICES INFORMATION message is in agreement with cell identification information of an MBMS control cell of said mobile terminal.

2. A mobile communication system comprising a radio control apparatus and a mobile terminal for sending an MBMS MODIFICATION REQUEST message to said radio control apparatus on a DCCH, said mobile terminal comprising:
   a controller for including cell identification information in said MBMS MODIFICATION REQUEST message; and
   a transmitter for sending said MBMS MODIFICATION REQUEST message with the cell identification information included therein to said radio control apparatus on the DCCH,
   wherein said controller sets said cell identification information as cell identification information of an MBMS control cell of said mobile terminal.

3. A radio control apparatus for sending an MBMS MODIFIED SERVICES INFORMATION message to a mobile terminal on a DCCH, comprising:
   a controller for including cell identification information in said MBMS MODIFIED SERVICES INFORMATION message; and
   a transmitter for sending said MBMS MODIFIED SERVICES INFORMATION message with the cell identification information included therein to said mobile terminal on the DCCH,
   wherein said cell identification information is used by said mobile terminal to determine whether or not to process said MBMS MODIFIED SERVICES INFORMATION message; and
   if said cell identification information is in agreement with cell identification information of an MBMS control cell of said mobile terminal, said mobile terminal processes said MBMS MODIFIED SERVICES INFORMATION message.

4. The radio control apparatus according to claim 3, wherein said mobile terminal processes other information than the cell identification information included in said MBMS MODIFIED SERVICES INFORMATION message.

5. The radio control apparatus according to claim 3, wherein said cell identification information comprises identification information of a cell to which said mobile terminal is connected by handover while in a state of establishing an individual channel and which is included in a service area of an MBMS to be changed.

6. The radio control apparatus according to claim 3, wherein said cell identification information comprises a primary scrambling code or a cell ID.

7. A mobile terminal for receiving an MBMS MODIFIED SERVICES INFORMATION message from a radio control apparatus on a DCCH, comprising:
   a receiver for receiving said MBMS MODIFIED SERVICES INFORMATION message with cell identification information included therein from said radio control apparatus; and
   a controller for processing said MBMS MODIFIED SERVICES INFORMATION message if the cell identification information included in said MBMS MODIFIED SERVICES INFORMATION message is in agreement with cell identification information of an MBMS control cell of said mobile terminal.

8. The mobile terminal according to claim 7, wherein said controller processes other information than the cell identification information included in said MBMS MODIFIED SERVICES INFORMATION message.

9. The mobile terminal according to claim 8, wherein said other information comprises action information about an action which said mobile terminal is required to perform, and said controller acquires information about a radio bearer based on said action information.

10. The mobile terminal according to claim 8, wherein said other information comprises action information about an action which said mobile terminal is required to perform, and said controller starts a service request procedure for receiving an MBMS based on said action information.

11. The mobile terminal according to claim 8, wherein said other information comprises action information about an action which said mobile terminal is required to perform, and said controller stops receiving an MBMS based on said action information.

12. The mobile terminal according to claim 7, wherein said cell identification information comprises identification information of a cell to which said mobile terminal is connected by handover while in a state of establishing an individual channel and which is included in a service area of an MBMS to be changed.

13. A mobile terminal for sending an MBMS MODIFICATION REQUEST message to a radio control apparatus on a DCCH, comprising:
- a controller for including cell identification information in said MBMS MODIFICATION REQUEST message; and
- a transmitter for sending said MBMS MODIFICATION REQUEST message with the cell identification information included therein to said radio control apparatus on the DCCH,
- wherein said controller sets said cell identification information as cell identification information of an MBMS control cell of said mobile terminal.

14. The mobile terminal according to claim 13, wherein said cell identification information comprises cell identification information of an MBMS control cell of said mobile terminal.

15. The mobile terminal according to claim 13, wherein said cell identification information comprises identification information of a cell from which said mobile terminal has received system information.

16. The mobile terminal according to claim 7, wherein said cell identification information comprises a primary scrambling code or a cell ID.

17. A message transmitting method for sending an MBMS MODIFIED SERVICES INFORMATION message from a radio control apparatus to a mobile terminal on a DCCH, wherein
- said radio control apparatus includes cell identification information in said MBMS MODIFIED SERVICES INFORMATION message; and
- said radio control apparatus sends said MBMS MODIFIED SERVICES INFORMATION message with the cell identification information included therein to said mobile terminal on the DCCH,
- wherein said cell identification information is used by said mobile terminal to determine whether or not to process said MBMS MODIFIED SERVICES INFORMATION message; and
- if said cell identification information is in agreement with cell identification information of an MBMS control cell of said mobile terminal, said mobile terminal processes said MBMS MODIFIED SERVICES INFORMATION message.

18. A message transmitting method for sending an MBMS MODIFICATION REQUEST message from a mobile terminal to a radio control apparatus on a DCCH, wherein
- said mobile terminal includes cell identification information in said MBMS MODIFICATION REQUEST message; and
- said mobile terminal sends said MBMS MODIFICATION REQUEST message with the cell identification information included therein to said radio control apparatus on the DCCH,
- wherein a controller sets said cell identification information as cell identification information of an MBMS control cell of said mobile terminal.

* * * * *